No. 670,843. Patented Mar. 26, 1901.
N. A. COBB.
PHOTOGRAPHIC SHUTTER.
(Application filed Mar. 26, 1900.)
(No Model.) 2 Sheets—Sheet 1.
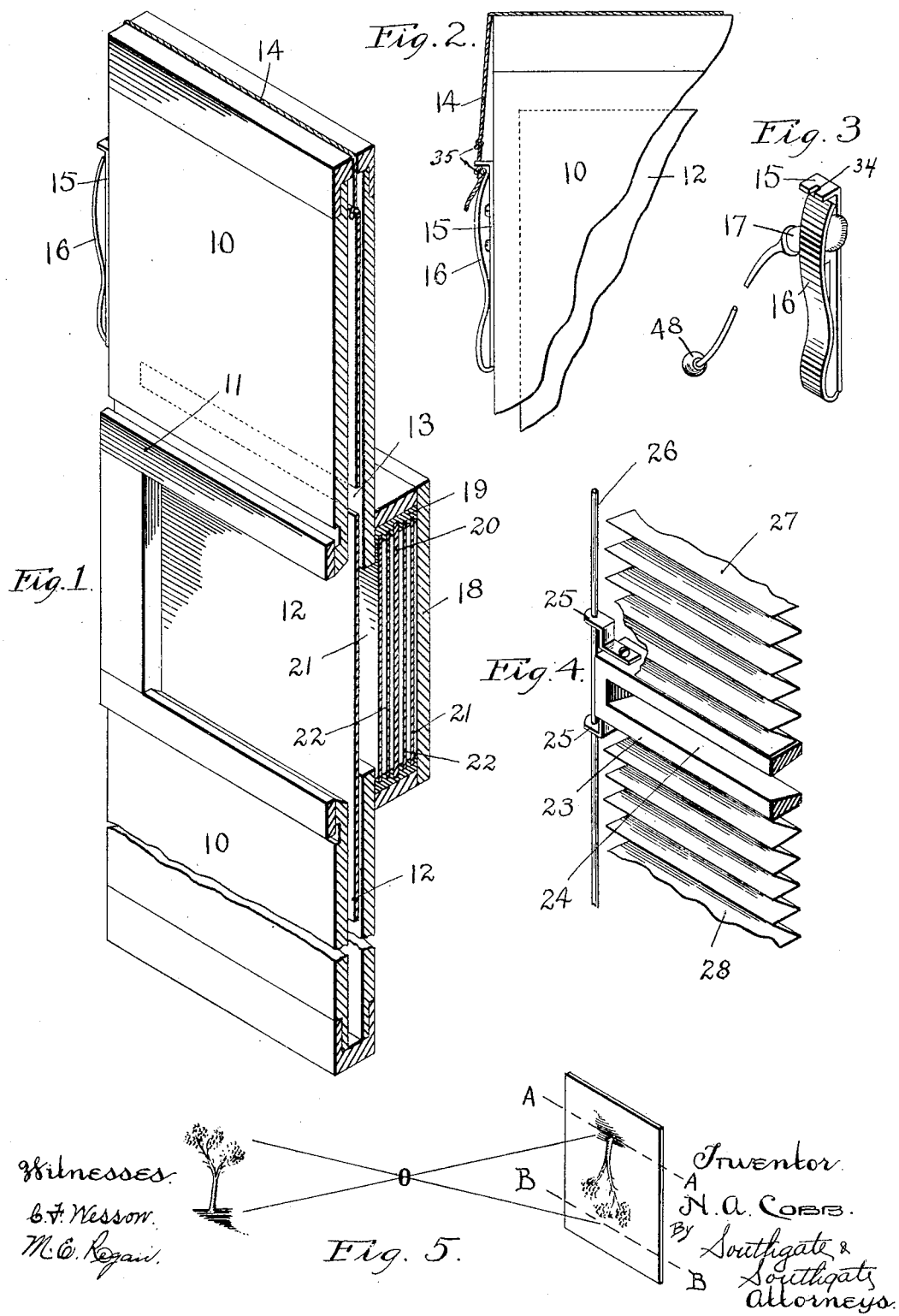

No. 670,843. Patented Mar. 26, 1901.
N. A. COBB.
PHOTOGRAPHIC SHUTTER.
(Application filed Mar. 26, 1900.)

(No Model.) 2 Sheets—Sheet 2.

Witnesses.
C. F. Wesson.
M. E. Regan.

Inventor.
N. A. Cobb.
By
Southgate & Southgate
Attorneys.

ously.

UNITED STATES PATENT OFFICE.

NATHAN A. COBB, OF SYDNEY, NEW SOUTH WALES.

PHOTOGRAPHIC SHUTTER.

SPECIFICATION forming part of Letters Patent No. 670,843, dated March 26, 1901.

Application filed March 26, 1900. Serial No. 10,119. (No model.)

*To all whom it may concern:*

Be it known that I, NATHAN A. COBB, a citizen of the United States, residing at Sydney, in the county of Cumberland, New South Wales, have invented a new and useful Photographic Shutter, of which the following is a specification.

This invention relates, primarily, to that class of shutters which operate directly in front of and close to the sensitive plate or film upon which the exposure is to be made. A photographic shutter of this class is sometimes called a "focal-plane" shutter.

The especial object of this invention is to provide a focal-plane shutter which will operate with an accelerating motion, insuring a more complete exposure of the foreground portions of an image than of the upper or sky portions of an image.

To this end this invention consists of the sliding focal-plane shutter, as hereinafter described, and combination therewith of a mechanism for setting and releasing the same.

Figure 6:
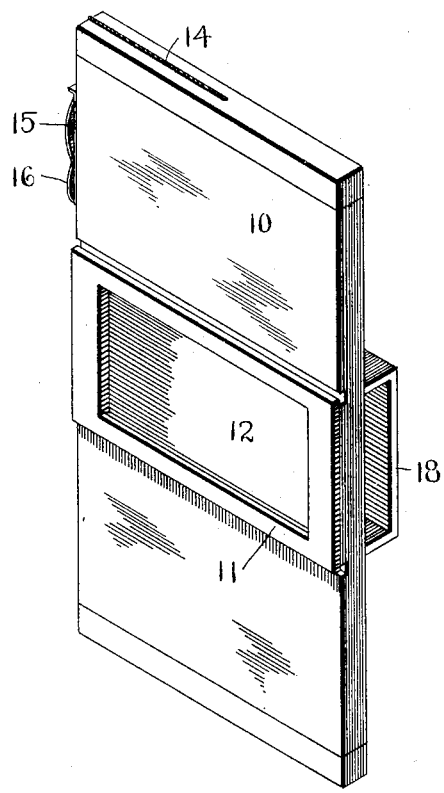
Figure 7:
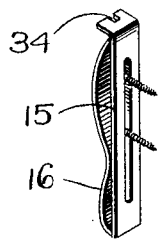
Figure 8:
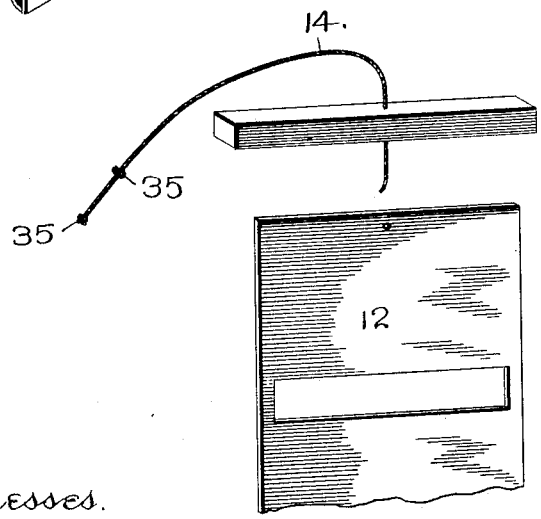

In the accompanying drawings, Figure 1 is a perspective view, partially broken away, illustrating a focal-plane shutter constructed according to this invention. Fig. 2 is a fragmentary view illustrating the position of the device for setting and releasing the shutter. Fig. 3 is an enlarged perspective view of the setting and releasing mechanism. Fig. 4 is a fragmentary view illustrating a modified form of construction. Fig. 5 is a diagrammatic view illustrating the operation of a shutter constructed according to this invention. Fig. 6 is a perspective view of the complete shutter, the plate-holder not being shown in position therein. Fig. 7 is a rear perspective view of the setting mechanism, illustrating the slot and screws employed for securing the setting mechanism in different positions; and Fig. 8 is a perspective view illustrating how the top of the casing may be removed to substitute slides having different widths of exposing-slits.

In nearly all photographic work, especially in outdoor or landscape work, the upper portion of the picture, usually the sky, will be overexposed, while the foreground, which is usually the darker portion of the picture, will often be underexposed.

The especial object of the present invention is to provide a simple, efficient, and inexpensive focal-plane shutter which will operate to give longer exposure to the foreground of a picture than to the upper or sky portion thereof. To accomplish this object, a photographic shutter constructed according to this invention consists of a drop-slide which is preferably actuated by gravity alone. The drop-slide has a transverse slot or exposing-slit therein, and the slide is mounted so that it will move comparatively slowly when passing the foreground portion of an image and so that its speed will have been accelerated and a shorter exposure will be given in exposing the upper portion or high light part of a picture.

Shading or varying the time of exposure of different parts of the same picture cannot be reliably effected by the use of spring-actuated shutters, as the tension of the operating-spring is greatest during the first part of the motion of the shutter, and this tension diminishes toward the end of the movement. On this account some spring-actuated shutters instead of having an accelerating motion will even be retarded toward the end of their motion, and in all cases the operation of spring-actuated shutters is necessarily varied.

In order to produce different relative amounts of acceleration of a focal-plane shutter constructed according to this invention, the devices for setting and releasing the shutter are preferably arranged so that the slide may be raised to different relative heights, and hence will have attained different relative velocities before commencing an exposure.

In order to secure differences in the time of exposure, the slide of a photographic shutter constructed according to this invention may be provided with devices for varying the width of the exposing-slit, although in practice where a simple form of shutter is desired it is preferable to employ interchangeable slides having exposing-slits of different widths, which slides may be substituted for each other as desired, the top or bottom of the casing being made removable for this purpose.

Referring to the accompanying drawings and in detail, a photographic shutter constructed according to this invention preferably comprises a main casing or frame 10. The casing or frame 10 has a central opening having a surrounding bead or rib 11 for detachably securing the casing of the shutter to the body portion of a camera.

Secured to the rear face of the main casing 10 is a supplemental casing 18 for receiving an ordinary plate-holder. As illustrated, the casing 18 contains a plate-holder 19, having a central partition 20 and exposing-slides 21, which may be drawn out sidewise to expose photographic plates, as 22.

Mounted in the main casing 10 is a gravity-slide 12, having an exposing-slit 13. The gravity-slide 12 may be held in its set or raised position by a cord which extends up through the casing 10 and is secured to a setting and releasing connection at the side of the casing. As shown most clearly in Fig. 3, the setting and releasing connection preferably employed comprises an angle-piece 15, having a notch 34 for engaging any one of a series of knots 35 in the cord 14. Coöperating with the angle-piece 15 and preferably formed integrally therewith is a spring-piece 16. The spring-piece 16 may be forced outwardly to release the cord 14, permitting the gravity-slide 12 to drop by a nipple 17, actuated from a bulb 48, or may be actuated by any of the other ordinary forms of releasing connections. As shown most clearly in Figs. 3 and 7, the setting and releasing mechanism preferably employed is secured to the side of the casing by screws extending through a slot in the piece 15, so that by loosening the screws the setting and releasing mechanism may be raised and lowered as desired.

The operation of a focal-plane gravity-actuated drop-shutter as thus constructed is most clearly illustrated in Fig. 5. As illustrated in this figure, nearly all subjects in landscape or similar photography have foregrounds which are darker than the upper portions or sky parts thereof. The images of such subjects are inverted by the lens, as illustrated, the darker portion of the image being uppermost on the sensitive plate or film. Now in order to prevent over-exposure of the sky portion of an image or an under-exposure of the foreground of an image it is essential that more time should be given to the upper part of a sensitive plate than to the lower part thereof, and this result is secured in a simple and efficient manner by the use of the focal-plane shutter before described—that is to say, the drop-slide 12 will be moving comparatively slowly when passing the position indicated by dotted lines A A, and its motion will have been accelerated by the time it reaches the position indicated by the line B B, so that the desired shading or variation in the time of exposure of different parts of the same plate will be secured. Furthermore, by employing a setting mechanism by means of which the drop-slide may be secured at different elevations before being released different relative speeds of the slide may be secured during the time of exposure, and by employing interchangeable slides having different widths of exposing-slits any desired total time of exposure may be secured that may be desired.

The form of shutter illustrated in Figs. 1 and 2 is especially well adapted for use in connection with comparatively small cameras.

In case it is desired to use a shutter constructed according to this invention in connection with a comparatively large camera, or if it is desired to diminish the size of the casing 10 in order to secure a more compact form of shutter, the construction illustrated in Fig. 4 may be employed—that is to say, the vertical dimension of the main casing or frame 10 of the photographic shutter may be diminished by employing a comparatively narrow drop-slide having creased or plated curtains secured thereto.

As shown in Fig. 4, the slide of a photographic shutter constructed according to this invention may consist of a comparatively narrow part or piece 23, having an exposing-slit 24. The drop-slide 23 is provided at its ends with brackets 25, which are mounted to slide on rods 26. This form of shutter may be operated by gravity and may be set and released by the same mechanism illustrated in connection with the form of shutter before described, although the form of construction illustrated in Fig. 4 may be used to advantage to form the moving part of a spring-actuated focal-plane shutter.

I am aware that numerous other changes may be made in the construction of photographic shutters without departing from the scope of my invention as expressed in the claims. I do not wish, therefore, to be limited to the forms herein shown and described; but What I do claim, and desire to secure by Letters Patent of the United States, is—

1. In a focal-plane photographic shutter, the combination of a gravity-actuated drop-slide, and means for setting said drop-slide at different heights, and for releasing the same, substantially as and for the purpose set forth.

2. In a focal-plane photographic shutter, the combination of a gravity-actuated drop-slide having an exposing-slit therein, a cord or flexible connection for holding the drop-slide at different heights, and a releasing mechanism for releasing said cord, substantially as described.

3. In a focal-plane photographic shutter, the combination of a gravity-actuated drop-slide having an exposing-slit therein, a cord 14 for raising the drop-slide and holding the same at different heights, a notched piece 15 for engaging any one of a series of knots in the cord 14, a spring releasing-piece 16, and connections for operating the same to release the cord and permit the slide to fall by gravity, substantially as described.

In testimony whereof I have hereunto set my hand in the presence of two subscribing witnesses.

N. A. COBB.

Witnesses:
FREDERICK B. HARLOW,
PHILIP W. SOUTHGATE.